United States Patent [19]

Inaba et al.

[11] Patent Number: 4,482,968

[45] Date of Patent: Nov. 13, 1984

[54] METHOD AND APPARATUS FOR ROBOT CONTROL

[75] Inventors: Hajimu Inaba, Hino; Shinsuke Sakakibara, Kunitachi, both of Japan

[73] Assignee: Fanuc Ltd., Tokyo, Japan

[21] Appl. No.: 334,928

[22] Filed: Dec. 28, 1981

[30] Foreign Application Priority Data

Dec. 30, 1980 [JP] Japan ................................ 55-186745

[51] Int. Cl.³ ............................................. G06F 15/46
[52] U.S. Cl. .................................. 364/513; 364/474; 364/167; 318/568
[58] Field of Search ............... 364/513, 474, 475, 191, 364/192, 193, 478, 167, 168, 169, 170, 171; 318/568, 632; 419/5, 730

[56] References Cited

U.S. PATENT DOCUMENTS

| | | | |
|---|---|---|---|
| 4,011,437 | 3/1977 | Hohn | 364/478 |
| 4,150,326 | 4/1979 | Engelberger et al. | 318/568 |
| 4,305,130 | 12/1981 | Kelley et al. | 364/513 |
| 4,347,578 | 8/1982 | Inaba | 364/478 |
| 4,356,554 | 10/1982 | Susnjara et al. | 364/513 |
| 4,362,977 | 12/1982 | Evans | 364/513 |
| 4,362,980 | 12/1982 | Itzkowitz | 318/632 |
| 4,365,301 | 12/1982 | Arnold et al. | 364/167 |
| 4,380,696 | 4/1983 | Masaki | 318/568 |

FOREIGN PATENT DOCUMENTS 2004668 4/1979 United Kingdom .

*Primary Examiner*—Jerry Smith
*Assistant Examiner*—John R. Lastova
*Attorney, Agent, or Firm*—Staas & Halsey

[57] ABSTRACT

A robot control method and apparatus of the type in which robot operations are taught in advance and the robot is subsequently actuated in accordance with the robot instruction data so taught. Areas in which the robot is forbidden to enter are established and the resulting information is stored in a memory. During the teaching of the robot operations the robot instruction data is created by moving the robot without regard to the forbidden areas. Thereafter, the robot instruction data so created is modified using the forbidden area information, the robot being controlled on the basis of the data so modified.

11 Claims, 12 Drawing Figures

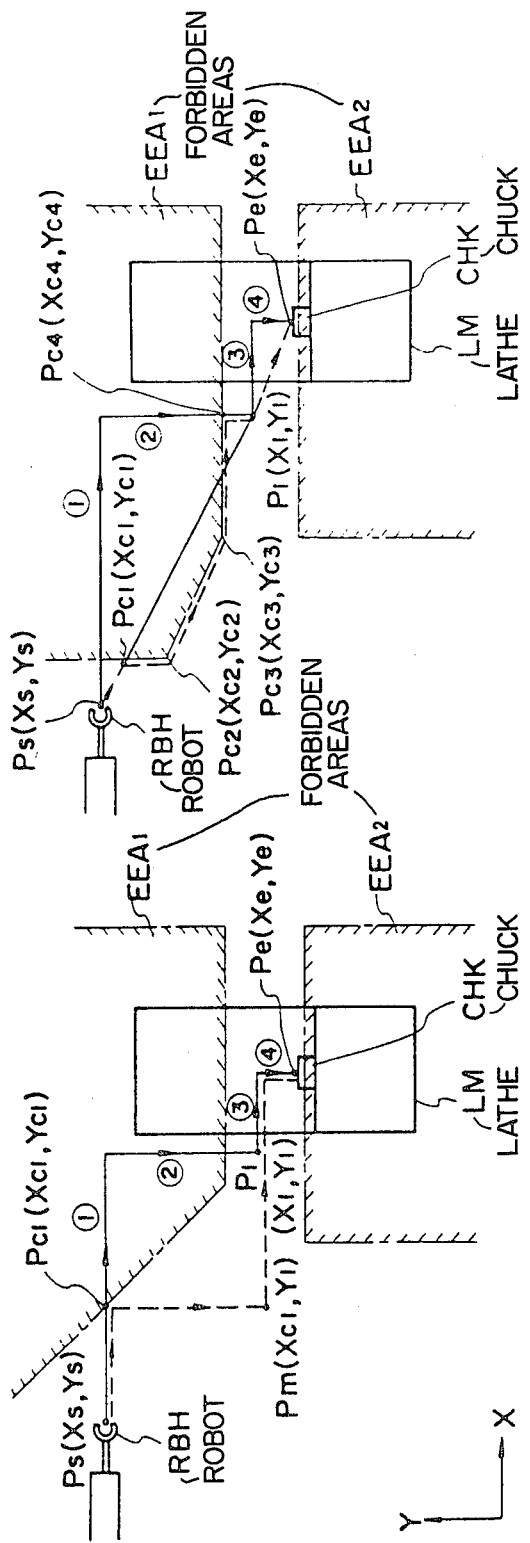

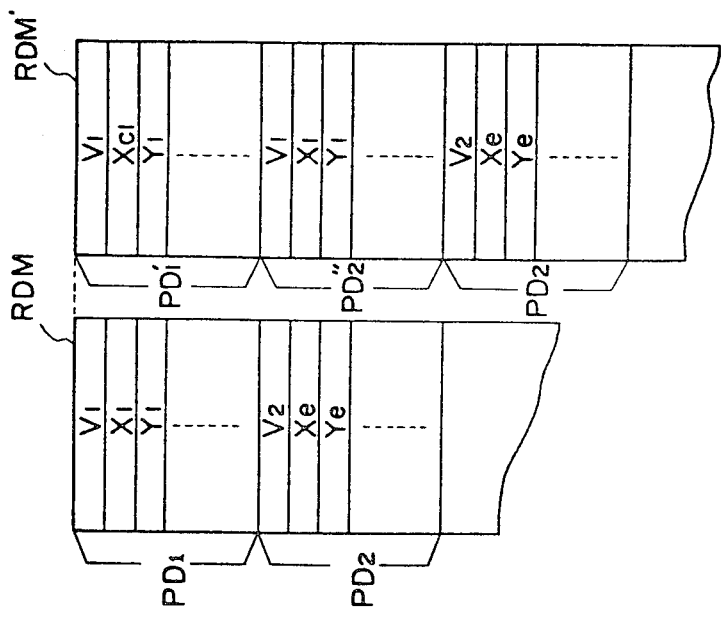
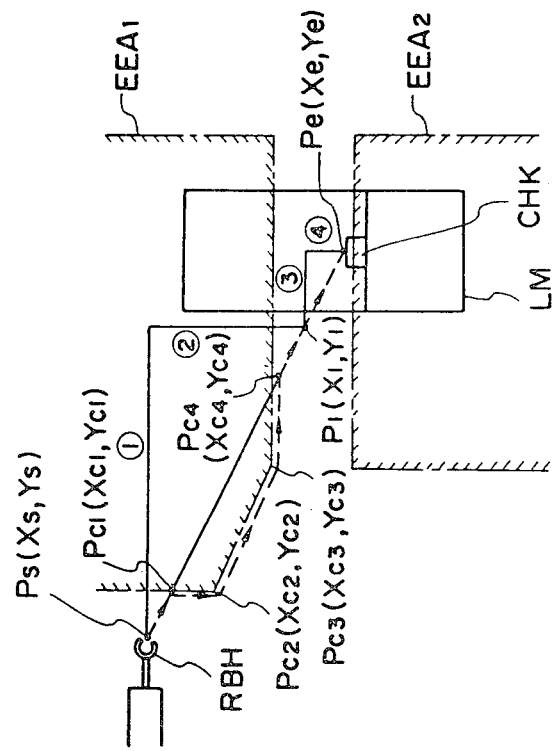

METHOD AND APPARATUS FOR ROBOT CONTROL

BACKGROUND OF THE INVENTION

This invention relates to a method and apparatus for controlling a robot and, more particularly, to a method and apparatus which enable a robot to perform its duties safely and to be taught those duties in a very simple manner.

The rising cost of labor in the industrialized world has given rise to a demand for labor-saving measures and for improvements in work procedures. Industrial robots have been put into use to meet this demand and have been very successful in doing so. Particularly outstanding results have been achieved in plants having numerous machine tools where industrial robots are used to perform such simple tasks as changing the workpieces and tools associated with each machine tool. The demand for such robots has grown yearly. These industrial robots have a so called "play-back" capability, in which the robots are taught their tasks or services and then caused to perform these tasks as necessary. Specifically, a teaching panel is used to enter the tasks that are to be performed, these tasks constituting robot instruction data which is stored beforehand in a memory located within the associated control unit. Whenever a request for a particular service arrive from the machine tool side, a series of the above robot instruction data is read out of the memory sequentially, and the robot responds to the instructions by servicing the machine tool in repeated fashion as required.

The robot instruction data comprises positional information regarding the point at which a service is to be performed, robot operating speed, and service codes which instruct how the robot hand is to be controlled at the abovementioned point and which also instructs the exchange of signals with the machine too. In general, the teaching operation mentioned above proceeds in the following order: (1) establish the memory addresses of the memory locations at which the items of robot instruction data are to be stored; (2) position the robot arm by a jog feed operation (that is, by moving the arm manually); (3) set the positional information regarding the servicing point and set the value of the speed command; and (4) set the robot service codes. A series of robot operations related to a machine tool is taught by repeating the aforesaid steps (1) through (4). Accordingly, as long as there are no problems with the mechanism or control system of the robot, and after the robot arm has been positioned at the predetermined operating speed, the robot will respond to the robot instruction data to execute such services as workpiece and/or tool exchange, cleaning of machining scraps, manipulation of the hand and the like.

In the aforesaid robot system the maximum range over which the robot is capable of moving is determined by the design specifications, but the robot has complete freedom of movement within this range. However, there are often cases where it is desired to establish, within the range of maximum allowable movement, an area or areas which the robot is forbidden to enter. Such areas will be referred to simply as forbidden areas hereinafter. These areas are necessary to ensure operator safety, and to prevent damage to the robot or machine tool, as would be likely to occur if the robot arm were to strike a portion of the machine tool projecting into the abovementioned range of allowable movement. A disadvantage encountered in establishing forbidden areas is a major complication of the teaching operation. This is because the operator must teach the robot not to enter a forbidden area which is difficult, time consuming and inherently prone to error.

BRIEF SUMMARY OF THE INVENTION

Accordingly, an object of the present invention is to provide a method and apparatus for robot control through which a robot can be taught tasks very simply even when forbidden areas have been established.

Another object of the present invention is to provide a method and apparatus for robot control which, despite established forbidden areas, permit an operator to teach a robot its tasks without taking the forbidden areas into consideration.

A further object of the present invention is to provide a method and apparatus for robot control wherein, after robot instruction data is prepared without taking forbidden areas into consideration, the data is modified automatically on the basis of the forbidden area information and the robot is then controlled on the basis of the robot instruction data so modified, whereby the robot is taught its tasks very simply and prevented from entering the forbidden areas.

Other features and advantages of the invention will be apparent from the following description taken in connection with the accompanying drawings.

BRIEF DESCRIPTION OF THE DRAWINGS

FIGS. 4, 5 and 6 are illustrative views useful in describing a robot control system according to the present invention;

FIG. 7 is an illustrative view useful in describing an example of storing taught data;

FIG. 10 is an illustrative view of taught data following modification according to the first embodiment.

DESCRIPTION OF THE PREFERRED EMBODIMENTS

Figure 1A:
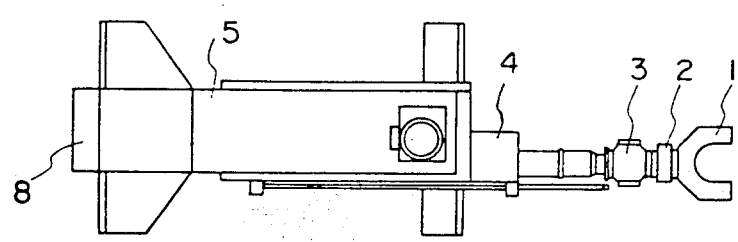
FIG. 1 shows an example of an industrial robot, in which (A) is a plan view and (B) a side view.
Figure 1B:
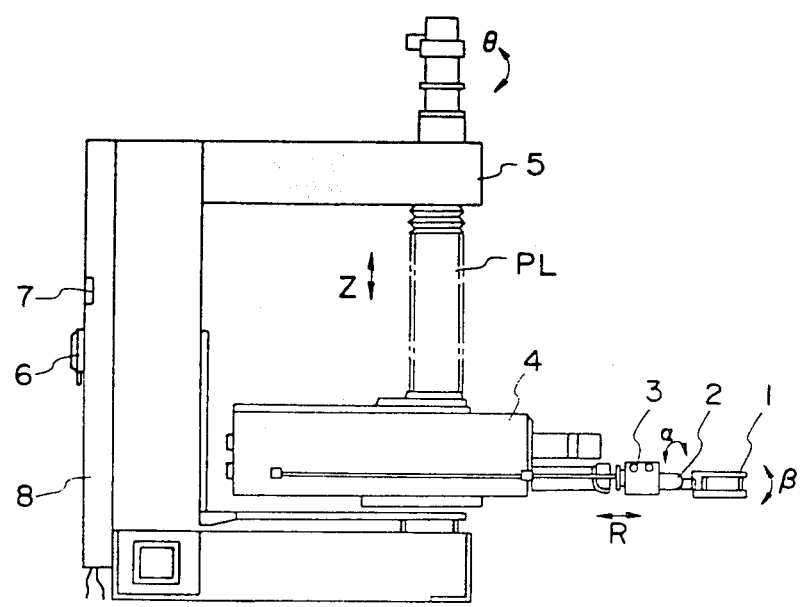

Referring first to FIG. 1, an industrial robot to which the present invention is applied comprises a mechanical hand 1 for gripping workpieces or tools that are to be exchanged, a wrist 2 capable of being twisted about the α-axis and inclined up and down along the β-axis, an arm 3 which can be freely extended and retracted along the R-axis, a casing 4 which can be moved vertically along the Z-axis along a shaft PL and swiveled from side to side about the θ-axis on the shaft PL, a frame 5 for supporting the casing, a teaching box 6 for teaching robot motion, a control panel 7 manipulated by the operator, and a control unit 8 for storing, in succession, the data taught using the teaching box (which data will be referred to as "instructive data") such as the operating position (the point at which a particular service is to be performed), the operating speed and the various services to be performed, and for controlling the motion of the hand 1, wrist 2, arm 3 and casing 4 in accordance with the instructive data.

Figure 2:
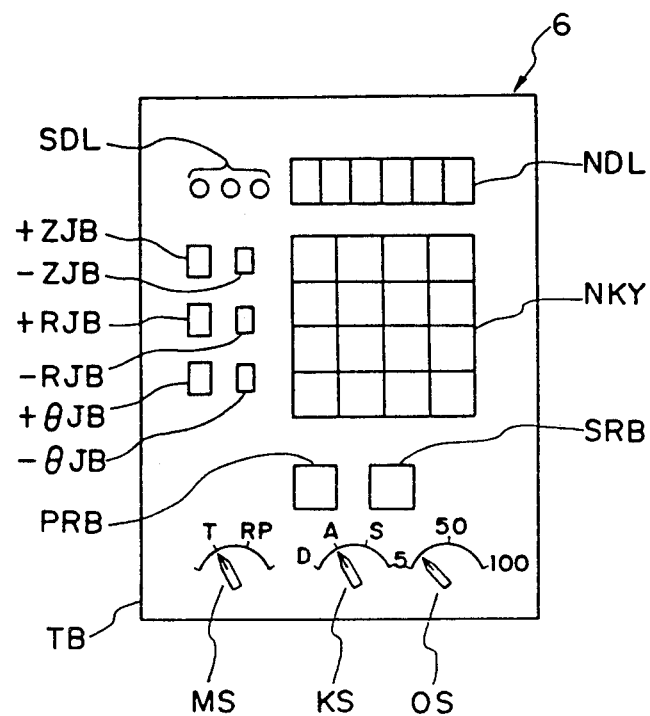
FIG. 2 is a plan view showing the panel face of a teaching box.

The panel surface of the teaching box 6 is shown in FIG. 2. The teaching box 6 includes a mode selection switch MS for selecting from among such modes as a teach mode "T" and a repeat mode "RD", a data classification selection switch KS for designating whether an input numerical value is data "D", and address "A", or a service code "S", an over-ride switch OS for applying an over-ride to the jog-feed speed and to the feed speed when the robot is running automatically, a jog button +ZJB for feeding the robot arm manually along the Z-axis in the positive direction, a jog button −ZJB for feeding the robot arm along the Z-axis in the negative direction, and, similarly, jog buttons +RJB, −RJB for feeding the robot arm manually along the R-axis in the positive and negative directions, respectively, and jog buttons +θJB, −θJB for feeding the robot arm manually along the θ-axis in the positive and negative directions, respectively. The teaching box 6 further includes a position record button PRB for storing, in an instructive data memory, such data as the current position of the robot that has been stored in a current position register, as will be described below, a service code record button SRB for storing service codes in the instructive data memory, numeric keys NKY for entering numerical values such as addresses and the like, status display lamps SDL for presenting an indication of an alarm or the like, and numeric display lamps NDL for displaying a six-digit decimal number which indicates the sequence number, service code, address, etc. The teaching of robot instruction data through use of the teaching box 6 is carried out through a sequence whose general features will now be described.

First, the data classification selection switch KS is set to the position "A" (address selection), after which the numeric keys NKY are operated to enter the address which designates the area of the instructive data memory into which the instructive data is to be written. This address is stored in the address register of a working memory, to be described later, and is simultaneously displayed by the first four digits of the numeric display lamps NDL. Next, the data classification selection switch KS is set to the position "D" (data selection) and the sequence number and robot operating speed are set. These values are set in a speed register located within the working memory and are simultaneously displayed on the numeric display lamps NDL. The robot arm is now jog-fed to the target position by appropriate manipulation of the jog buttons +ZJB, −ZJB, +RJB, −RJB, +θJB, −θJB. Manipulating the jog buttons causes a pulse distributor to produce pulses each of which updates, by +1 or −1, depending upon the direction of arm movement, the data stored in the current position register of the working memory. The content of the current position register will therefore always indicate the current position of the robot arm. Next, the position record button PRB is depressed, that is, after the jog feed operation. This causes the address, target position, feed speed and sequence number, stored in the address register, current position register and speed register, etc., to be transferred to and stored in the area of the instructive data memory designated by the address. This ends the teaching operation for movement of the robot arm to the target position.

Following completion of the above the operator sets the data classification selection switch KS to the "S" position (service code selection), enters, in the form of a robot service code, the activities to be performed by the robot hand and by the machine tool at the target position, and then depresses the service code record button SRB. This causes the service code to be stored in the predetermined area of the instructive data memory that has been designated by the abovementioned address. Thus the manipulation of the service record button SRB ends the procedure for teaching one set of robot instruction data. If the sequence of steps described above is repeated, an entire series of robot instruction data can be stored in the instructive data memory. The entry of a full series of such data completes the teaching of all the necessary robot instruction data.

The exchange of data between the teaching box 6 and the control unit will now be described in conjunction with FIG. 3, in which portions identical with those of FIG. 2 are designated by like reference characters. The teaching box 6 includes a decoder DECT and AND gates $AG_i$ ($i=1, 2, \ldots$) for delivering signals to a data bus DBUS as will be described below. The decoder DECT decodes addresses received from a processing unit MPUR over an address bus ABUS and responds by opening predetermined AND gates $AG_i$. As a result, the AND gates $AG_i$ supply the data bus DBUS with logic signals "1", "0" which indicate the status of, for example, the jog buttons +ZJB, −ZJB, +RJB, −RJB, +θJB, −θJB, the position record button PRB, the service code record button SRB and the numeric keys NKY, as well as the status of the mode selection switch MS and data classification selection switch KS. More specifically, the processor MPUR is adapted to successively generate, at high speed the addresses for the push-buttons and keys +ZJB through NKY, and for the selection switches MS, KS, OS, whereby the status of the push-buttons and keys (namely whether they have been depressed or not) and the status of the selection switches (namely the positions to which the selection switches have been set) are read. The processing unit MPUR then executes the prescribed teaching control operation on the basis of the status of the foregoing buttons, keys and switches.

In operation, the following occurs in teaching the robot instruction data. First, the operator selects the teach mode "T" using the mode selection switch MS. The status of the selection switch MS is recognized immediately by the processing unit MPUR. Next, the operator sets the data classification selection switch KS to the address position "A" and then operates the numeric keys NKY to enter an address, whereupon the address data is stored in the address register AR of a working memory WMR. Next, assume that the operator depresses the jog button +ZJB to perform a jog feed. The processing unit MPUR senses the depressed state of the jog button +ZJB in the manner described above and responds by causing a pulse distributor PDR to begin a pulse distribution operation. The pulse distributor PDR consequently generates distributed pulses $Z_p$ which cause the robot arm to move along the Z-axis in the position direction.

Figure 11:
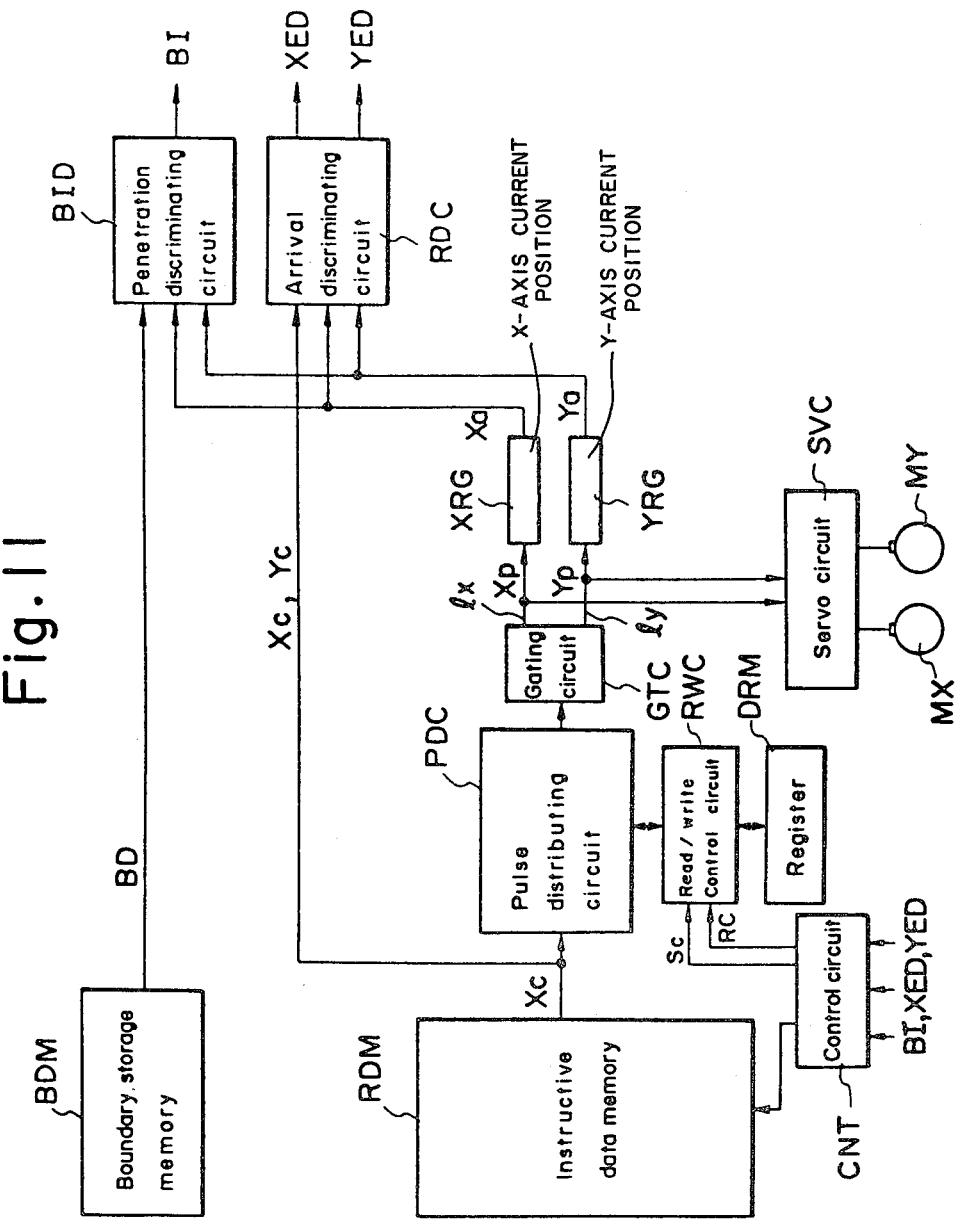
FIG. 11 is a block diagram illustrating a second embodiment of an apparatus for practicing a robot control method according to the present invention.

As seen in FIG. 11, the position of the robot arm is continuously monitored by an x-axis current position register XRG, and an y-axis current position register YRG. The signals generated by these registers are applied to an arrival discrimination circuit RDC and to a boundary penetration discriminating circuit BID. The discrimination circuits detect whether the robot arm has reached a commanded position or penetrated a forbidden area. The content of the Z-axis current position register PRZ in the working memory WMR is up-dated by +1 or −1, depending upon the direction of robot arm movement, each time a distributed pulse $Z_p$ is generated. When the arm arrives at the prescribed position along the Z-axis, the operator releases the jog button +ZJB. This is sensed immediately by the processing unit MPUR which now responds by terminating the pulse distributing operation of the pulse distributor PDR. The operator then operates the remaining jog buttons in suitable fashion to jog feed the arm along the corresponding controlled axes R, $\theta$ until the arm is positioned finally at the prescribed target position. Now the operator depresses the position record button PRB. This causes the contents (indicative of the current position of the arm) of current position registers PRZ, PRR, PR$\theta$ to be stored in the areas of the instructive data memory RDM designated by the address stored in the address register AR. This ends the teaching operation relating to the magnitude of robot arm movement.

Figure 3:
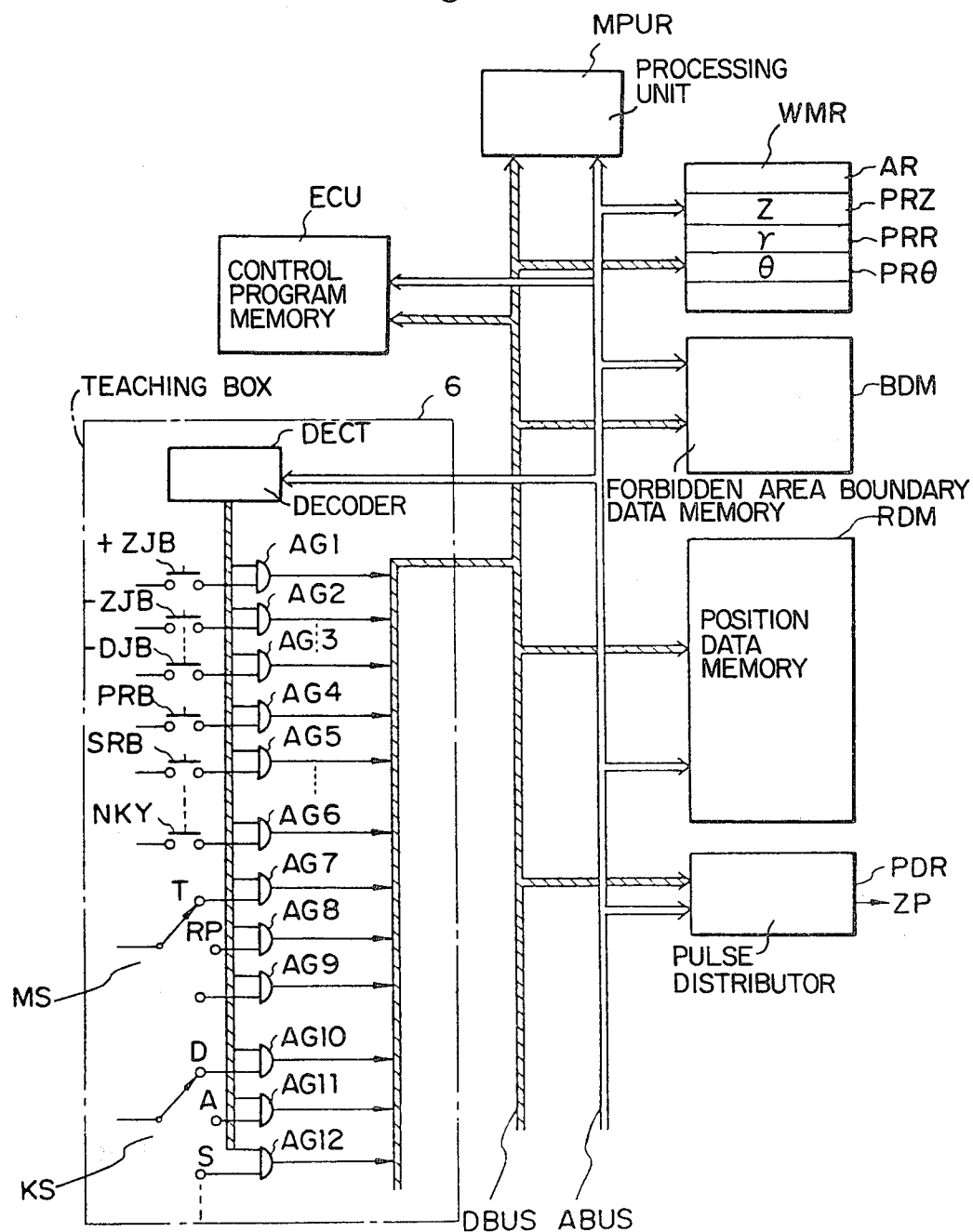
FIG. 3 is an illustrative view useful in describing the operation of the teaching box illustrated in FIG. 2.

In FIG. 3 ECU represents a program memory for storing a control program, and BDM denotes a memory for storing data relating to the boundaries of forbidden areas, as will be described below.

Reference will now be had to FIGS. 4 through 6 to describe a robot control method according to the present invention. In FIG. 4 the robot is moved along its axes one axis at a time, whereas in FIGS. 5 and 6 it is moved along two axes at a time. For convenience we will adopt a rectangular coordinate system having the perpendicular axes X and Y.

In FIGS. 4 through 6, LM denotes a lathe, CHK a chuck, RBH the robot hand, and EEA$_1$, EEA$_2$ forbidden areas as described above. The hand RBH is controlled along one axis at a time in FIG. 4, and along two axes at a time in FIGS. 5 and 6. In the teaching operation according to the present invention, the hand RBH is first moved to point P$_1$ along the solid lines (1), (2) in FIGS. 4 through 6, and the robot is taught the point P$_1$ as well as the speed V$_1$ at which the hand RBH is to be moved to point P$_1$. This data will be referred to as point data PD$_1$. The hand RBH is moved subsequently to point P$_e$ along the solid lines (3), (4), and the point P$_e$, the speed V$_2$ to that point, and the prescribed robot service to be performed at point P$_e$ are taught. This data will be referred to a point data PD$_2$. Thus, in the teaching operation, the hand RBH penetrates the forbidden area EEA$_1$, but this event is ignored in teaching the point data PD$_1$, PD$_2$. The items of point data PD$_1$, PD$_2$ are stored in the data memory RDM of the robot control unit, in the fashion illustrated in FIG. 7.

Two preferred embodiments of the present invention will be described below. In the first embodiment, the data which has been taught in the manner described above (namely the point data PD$_1$, PD$_2$, ... ) is modified on the basis of the forbidden areas by means of an automatic editing processor. Specifically, the data which has been taught may be modified automatically in such a manner that the hand is moved along the dashed lines of FIGS. 4 through 6 so as not to penetrate the forbidden areas, or along the dashed lines in FIGS. 5 and 6 following the boundary of the forbidden area EEA$_1$, or along the dashed lines in FIG. 6 so as to follow the shortest path to the point P$_e$ without penetrating the forbidden areas. In the second embodiment of the invention, the actual motion of the robot is modified in such a manner that the robot hand moves along any of the paths indicated by the dashed lines in FIGS. 4 through 6, without requiring that the instructive data be modified on the basis of the information regarding the forbidden areas.

Figure 8:
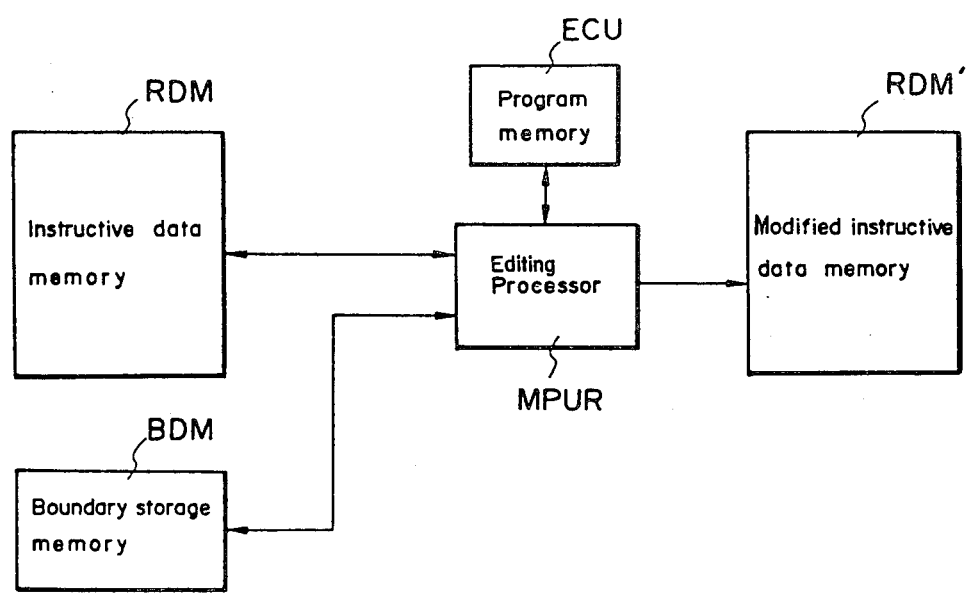
FIG. 8 is a block diagram illustrating a first embodiment of an apparatus for practicing a robot control method according to the present invention.
Figure 9:
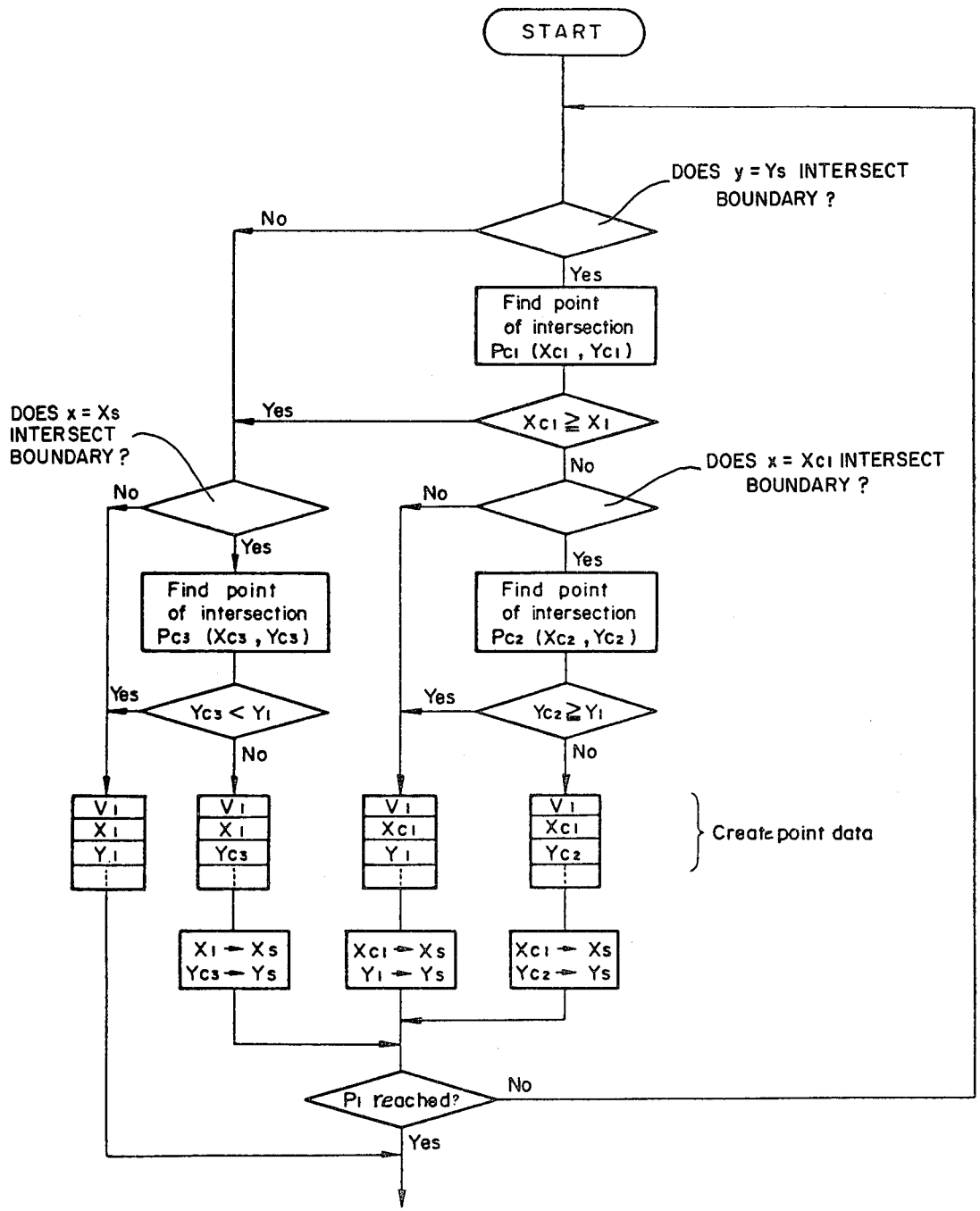
FIG. 9 is a flowchart associated with the first embodiment.

The first embodiment of the inventive robot control system will now be described with reference to FIG. 8, which is a block diagram of an embodiment of an apparatus for modifying the instructive data automatically on the basis of the forbidden area information. In FIG. 8, RDM denotes an instructive data memory for storing a multiplicity of point data PD$_1$, PD$_2$, ... entered by the operator during the teaching operation. ECU represents a program memory which stores a program for modifying the instructive data. In a case where this modification program is to modify the path followed by the mechanical hand into the path indicated by the dashed lines in FIG. 4, the program may be created in accordance with the flowchart shown in FIG. 9. The automatic editing processor, MPUR, denotes a processor for modifying the instructive data in accordance with the modification program. RDM' is a data memory for storing the instructive data which has been modified.

In operation, the processor MPUR executes a process for modifying the instructive data in accordance with the modification program using information indicative of forbidden area boundaries, thereby creating modified data which is stored in the data memory RDM'. As a result, the instructive data (FIG. 7) for moving the mechanical hand along the dashed lines in FIG. 4 is modified into the data shown in FIG. 10.

A block diagram illustrating the second embodiment of the present invention is shown in FIG. 11. Here the actual robot motion is modified in such a manner that the robot hand follows the dashed lines in FIGS. 4 through 6. In accordance with this embodiment, however, the instructive data is not modified on the basis of the forbidden area information. In FIG. 11, RDM denotes an instructive data memory for storing the instructive data, BDM represents a boundary memory for storing information relating to the boundaries of the forbidden areas, CNT denotes a control circuit, PDC denotes a pulse distributing circuit for executing a pulse distribution operation in accordance with the positional instruction information contained in the instructive data, RWC denotes a write/read control circuit, and DRM represents a register which, when the mechanical hand arrives at a boundary of a forbidden area, stores or "saves" a numerical value which has been set in the pulse distributing circuit PDC. GTC is a gating circuit which delivers distributed pulses $X_p$ on line $l_x$ or distributed pulses $Y_p$ on line $l_y$ in accordance with whether the pulses are being distributed along the X-axis or Y-axis, respectively. XRG, YRG denote an X-axis current position register and a Y-axis current position register for storing the current positions $X_a$ and $Y_a$ along X-axis and Y-axis, respectively, by counting up or counting down the distributed pulses $X_p$, $Y_p$, respectively, in accordance with the direction of the mechanical hand movement. RDC represents an arrival discrimination circuit for discriminating whether the current mechanical hand positions $X_a$, $Y_a$ along the X- and Y-axes have arrived at the respective instructed positions $X_c$, $Y_c$, and for delivering to a control circuit CNT an arrival signal XED indicating arrival of the mechanical hand at the position $X_c$ along the X-axis when $X_a = X_c$, and an arrival signal YED indicating arrival of the mechanical hand at the position $Y_c$ along the Y-axis when $Y_a=Y_c$. BID represents a boundary penetration discriminating circuit which receives boundary information BD from the boundary memory BDM and the current position information $X_a$, $Y_a$ from the current position registers XRG, YRG to discriminate whether the mechanical hand at its current position has started to penetrate a forbidden area. SVC is a servo circuit which is responsive to the distributed pulses $X_p$, $Y_p$ to drive an X-axis servomotor MX and a Y-axis servomotor MY into rotation.

The operation of the arrangement shown in FIG. 11 will now be described in conjunction with FIGS. 4 and 7. First, the instructive data memory RDM delivers the positional command $X_1$ ($X_c=X_1$) along the X-axis, this data being taken from the point data $PD_1$ (refer to FIG. 7). The value $X_1$ is set in a register (not shown) located within the pulse distribution circuit PDC, the latter responding by generating distributed pulses $X_p$ which the gating circuit GTC permits to enter the servo circuit SVC. The servo circuit SVC responds by driving the X-axis servomotor MX which transports the robot hand along the X-axis. At the same time, the gating circuit GTC applies the distributed pulses $X_p$ to the X-axis current position register XRG which counts the pulses up or down in accordance with the direction of mechanical hand movement. The pulses are counted up in the case of FIG. 4 since the hand is travelling in the positive direction. In the meantime, the current positions $X_a$, $Y_a$ along the X- and Y-axes are constantly entering the arrival discriminating circuit RDC and the penetration discriminating circuit BID. These circuits RDC, BID are operable to discriminate whether the mechanical hand has arrived at the commanded position ($X_1$), and whether it has started to penetrate a forbidden area, respectively.

As the pulse distributing operation continues, the robot mechanical hand is moved along the X-axis in the positive direction and arrives at the forbidden area $EEA_1$ at point $PC_1$ in FIG. 4. This event is discriminated immediately by the discrimination circuit BID which responds by issuing a signal BI indicative of the fact. The signal BI is coupled to the control circuit CNT which responds by producing a save command SC that is applied to the read/write control circuit RWC. This circuit responds by calling the numerical value $X_1$ from the register of the pulse distributing circuit PDC, and by transferring this value to the register DRM where it is stored or "saved". The control circuit CNT in response to the signal BI also causes the instructive data memory RDM to set the positional command $Y_1$ along the Y-axis in the register of the pulse distributing circuit PDC to replace the value $X_1$. In consequence, the pulse distributing circuit PDC now begins a pulse distributing operation along the Y-axis instead of along the X-axis, by generating the Y-axis distribution pulses $Y_p$. These pulses are passed by the gating circuit GTS and appear on line $l_y$, entering the servo circuit SVC which responds by driving the Y-axis servomotor MY to move the robot mechanical hand along the Y-axis. At the same time, the Y-axis pulses $Y_p$ are counted up or down (down in the case of FIG. 4) by the Y-axis current position register YRG in accordance with the direction of hand movement.

Thus, in accordance with the foregoing series of operations, the robot mechanical hand, which is just about to enter the forbidden area $EEA_1$ in travelling along the X-axis, has its direction of motion changed by moving it toward the point $P_m$ (FIG. 4), whereby penetration of the forbidden area $EEA_1$ is prevented. Then, when the robot mechanical hand arrives at the point $P_m$, the arrival discrimination circuit RDC senses the fact and sends the Y-axis arrival signal YED to the control circuit CNT, which in turn supplies the read/write control circuit RWC with a command RC for recovery of the commanded value $X_1$. In response to the recovery command RC, the value $X_1$, saved in the register DRM as described above, is called from the register DRM and set again in the register (not shown) of the pulse distributing circuit PDC. The latter therefore resumes the pulse distribution operation along the X-axis, generating the pulses $X_p$ that rotate the X-axis servomotor MX in the manner described above. The mechanical hand therefore starts to be moved toward the point $P_1$. Then, when the mechanical hand arrives at point $P_1$, the arrival discrimination circuit RDC sends the X-axis arrival signal XED to the control circuit CNT, ending the control operation for mechanical hand movement based on the first point data $PD_1$ (refer to FIG. 7). Mechanical hand movement control then is carried out on the basis of the second point data $PD_2$ to move the mechanical hand to point $P_e$.

The foregoing embodiments have been described in connection with FIG. 4. However, control can be effected in the same way in the cases of FIGS. 5 and 6 by altering the modification program or the hardware. Furthermore, in the embodiment of FIG. 11, the blocks are composed of hardware having individual functions, but it is possible to adopt an arrangement in which processing is executed by a robot control apparatus constituted by a computer.

In accordance with the present invention, therefore, instructive data for controlling a robot can be created without the operator/programmer being required to take forbidden areas into consideration when such areas exist within the robot's working area. This assures a high degree of safety in the working area and both simplifies the robot teaching operation and shortens the time required for the operation.

As many apparently widely different embodiments of the present invention can be made without departing from the spirit and scope thereof, it is to be understood that the invention is not limited to the specific embodiments thereof except as defined in the appended claims.

What we claim is:

1. A method of controlling a robot having predetermined forbidden areas of movement, wherein robot operations are stored as robot instruction data in a first memory and the robot is subsequently actuated in accordance with the stored robot instruction data, comprising the steps of:
  (a) storing in a second memory predetermined information indicative of the predetermined forbidden areas which the robot is forbidden to enter;
  (b) creating robot instruction data by moving the robot along a desired path to a target position during the storing of robot operations, without regard to said predetermined forbidden areas by storing in the first memory, robot instruction data representing the desired path;
  (c) modifying the robot instruction data in accordance with said predetermined information indicative of the predetermined forbidden areas; and
  (d) controlling the motion of the robot in accordance with the modified robot instruction data.

2. The method of controlling a robot according to claim 1, wherein the robot instruction data is modified in accordance with the predetermined information indicative of the forbidden areas, in such manner that the robot does not enter said forbidden areas.

3. The method of controlling a robot according to claim 1, wherein the robot instruction data is modified in accordance with the predetermined information indicative of the forbidden areas, in such a manner that the robot moves along the boundaries of the forbidden areas.

4. The method of controlling a robot according to claim 3, wherein the robot instruction data is modified in accordance with the predetermined information indicative of the forbidden areas, in such a manner that the robot moves to said target position along the shortest possible path.

5. A method of controlling a robot having predetermined forbidden areas of movement, wherein robot operations are stored as robot instruction data in a first memory and the robot is subsequently actuated in accordance with the stored robot instruction data, comprising the steps of:

(a) storing in a second memory predetermined information indicative of the predetermined forbidden areas;

(b) creating robot instruction data by moving the robot along a desired path to a target position during the storing of robot operations, without regard to said predetermined forbidden areas;

(c) detecting when the robot starts to enter a forbidden area in accordance with said stored robot instruction data; and (d) modifying the path of robot movement, when the robot is about to enter a forbidden area, in such a manner that the robot does not penetrate the forbidden area.

6. A method of controlling a robot according to claim 5, wherein step (d) further comprises modifying the path of the robot movement such that the robot moves along the boundaries of the forbidden areas of movement.

7. A method of controlling a robot according to claim 5, wherein step (d) further comprises modifying the path of the robot movement such that the robot follows the shortest path to said target position.

8. A robot control apparatus for actuating a robot having predetermined forbidden areas of movement, in accordance with predetermined, stored robot instruction data indicative of robot operations, said apparatus comprises:

boundary storage means for storing information indicative of the boundaries of the predetermined forbidden areas of movement;

a robot instruction data memory for storing said predetermined, stored robot instruction data created without regard to the information indicative of the boundaries of the predetermined forbidden areas of movement;

a processing unit operatively connected to said boundary storage means and to said robot instruction data memory, for modifying the predetermined, stored robot instruction data using said information indicative of the boundaries of the forbidden areas of movement; and means for controlling the robot in accordance with the modified predetermined, stored robot instruction data.

9. A robot control apparatus for actuating a robot having predetermined forbidden areas of movement, in accordance with predetermined, stored robot instruction data, indicative of robot operations, said apparatus comprises:

boundary storage means for storing information indicative of the boundaries of the predetermined forbidden areas of movement;

a robot instruction data memory for storing said predetermined, stored robot instruction data created without regard to the information indicative of the boundaries of the predetermined forbidden areas of movement;

a positional servo system operatively connected to said robot instruction data memory, for operating the robot as instructed by said predetermined, stored robot instruction data;

current position storage means for storing the current position of the robot;

discrimination means for discriminating whether the robot has started to enter a forbidden area and for providing a discrimination signal indicative of such, using the current position of the robot and said information indicative of the boundaries of the predetermined forbidden areas of movement; and means for modifying the path of robot movement in response to said signal from said discrimination means indicating that the robot has started to enter a forbidden area.

10. A robot control apparatus according to claim 9, further comprising:

detecting means for detecting the coincidence of the current position of the robot and said target position, and for providing a detection signal responsive to said coincidence;

servo control means operatively connected between said instruction data memory and said position servo system, and operatively connected to said discrimination means, for controlling said positional servo system in accordance with said discrimination signal, said detecting signal, and said predetermined, stored robot instruction data.

11. A robot control apparatus according to claim 10, wherein said servo control means comprises:

a pulse distributing circuit operatively connected between said positional servo system and said robot instruction data memory, for generating pulse signals in accordance with said predetermined, stored instruction data;

a read-write control circuit operatively connected between said discrimination means said detecting means, and said pulse distributing circuit, for controlling said pulse distributing circuit in accordance with said detecting signal and said discrimination signal;

temporary storage means operatively connected to said read-write control circuit, for storing at least a portion of the information indicating the target position, in response to said discrimination signal;

a control circuit operatively connected between said discrimination means said detecting means, and said read-write control circuit, and operatively connected to said robot instruction data memory, for controlling said robot instruction data memory and said read-write control circuit in response to said discrimination signal and said detection signal.

* * * * *